Feb. 22, 1966   N. F. HARWOOD ETAL   3,235,907
BLOW MOULDING APPARATUS
Filed March 14, 1963
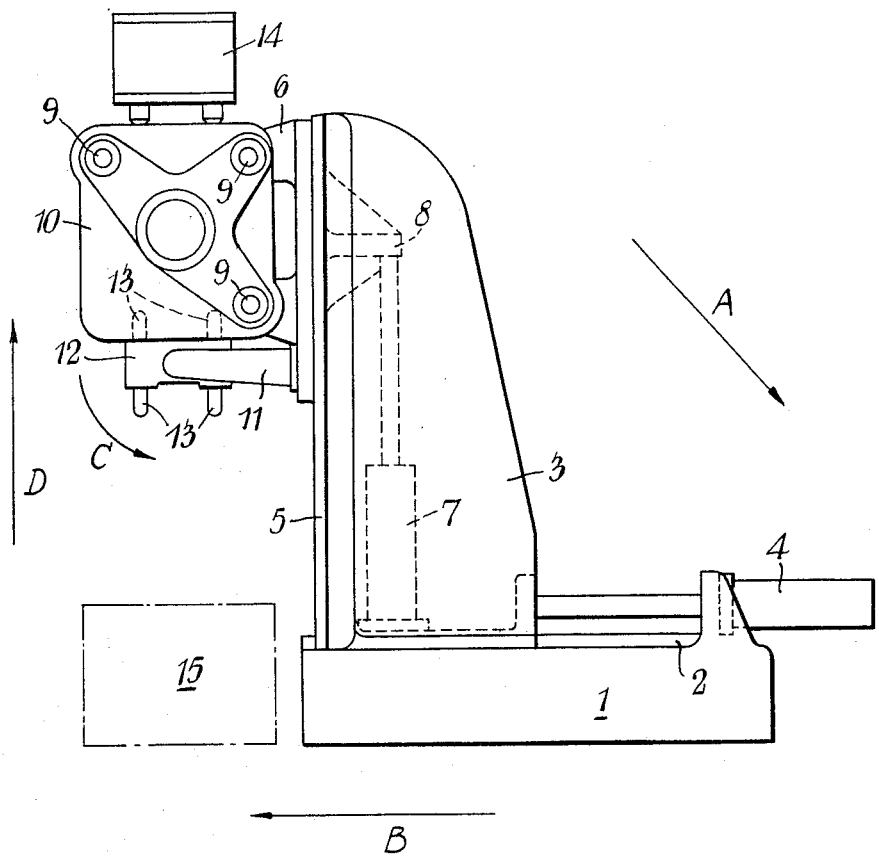
INVENTORS
NORMAN FREDERICK HARWOOD
ALAN JOHN OSBORNE
BY Larmer, Larmer, & McCulloch

United States Patent Office 3,235,907
Patented Feb. 22, 1966

3,235,907
BLOW MOULDING APPARATUS
Norman Frederick Harwood, Claygate, Surrey, and Alan John Osborne, Cheam, Surrey, England, assignors to Baker Perkins Inc., Saginaw, Mich., a corporation of New York
Filed Mar. 14, 1963, Ser. No. 265,194
Claims priority, application Great Britain, Mar. 16, 1962, 10,211/62
3 Claims. (Cl. 18—5)

The present invention relates to blow moulding apparatus and in particular to the construction and operation of apparatus of the kind including at least one blowing spigot and mould assembly arranged for movement to an extruding station beneath a continuous operable extruder to accept extruded tube therefrom, the assembly being removed from said station during the execution of blowing and extracting operations, driven past a discharge station where the moulded part is discharged, and then returned to said station to receive a further length of extruded material. Apparatus of this kind will be referred to hereinafter as "apparatus of the kind set forth."

According to the invention there is provided blow moulding apparatus of the kind set forth, wherein the blowing spigot and mould assembly is arranged for movement from and to the extruding station along a closed orbital path that preferably is triangular in shape.

Preferably the blowing spigot and mould assembly is arranged to move towards and away from said station around a right angled triangular path, movement in one direction being along the hypotenuse of said path whilst movement in the other direction takes place along the right angled sides of the path.

In order that the invention may be more fully understood, one construction of blow moulding apparatus in accordance with the invention will now be described, by way of example, with reference to the accompanying drawing which illustrates diagrammatically the apparatus in elevation.

The apparatus includes a base 1 which is provided with a slideway 2 for receiving a key, not shown, extending over a substantial length of the underneath of an upstanding column 3. The base further carries a hydraulic piston and cylinder assembly 4, the piston rod of which is secured to the column whereby the latter can be traversed over the base 1. The column is also provided with a slideway 5 for receiving a key, not shown, forming part of a bracket 6. The column 3 houses a further piston and cylinder assembly 7, the piston and cylinder of which are respectively secured to an arm 8 projecting from the bracket 6 and to the column 3. Actuation of the piston and cylinder assembly 7 effects a raising or lowering of the bracket 6 on the column 3.

The bracket carries three transverse rods 9 on which two platens 10, only one of which may be seen in the drawing, are mounted for horizontal reciprocatory opening and closing movement. The bracket 6 also carries an arm 11 at the free end of which is pivoted a spigot bar 12. The spigot bar supports four blowing spigots 13 arranged in oppositely facing pairs and means, not shown, are provided for angularly displacing the spigot bar so that either of the spigot pairs project between the platens 10. The spigots 13 and platens 10 constitute a spigot and mould assembly.

The apparatus further includes a continuously operable extruder having a head 14 positioned at the extruding station and arranged to extrude two lengths of tubing to engage with one pair of the spigots 13 when the column 3 is advanced to the left in the drawing and the bracket 6 is in an uppermost position, the platens 10 of course being open. The apparatus moreover includes a trimming unit 15 located at a discharge station and situated vertically below the extruder head 14.

The operation of the apparatus will now be described on the assumption that to begin with, the column 3 and the bracket 6 are in the positions shown in the drawing with the platens 10 open. When two lengths of extruded material have engaged the appropriate blowing spigots 13, the platens are closed about the lengths of tube, during which the tube lengths are severed from the head 14. The piston and cylinder assemblies 4 and 7 are now operated simultaneously to traverse the column 3 to the right, in the drawing, and to lower the bracket 6. The simultaneous action of the piston and cylinder assemblies results in the spigot and mould assembly moving away from the extruding station beneath the extruder head 14 along a downwardly inclined course or hypotenuse of the triangular path indicated by the arrow A. During movement of the assembly along this course, the two lengths of extruded tube held between the platens 10 and over the blowing spigots 13 are blown to form articles within the mould, constituted by the platens 10, and the articles are cooled. Reversal of the piston and cylinder assembly 4 is now initiated to traverse the column 3 to the left resulting in the spigot and mould assembly being moved along a horizontal course indicated by the arrow B. During this latter movement the platens 10 open and the spigot bar 12 is angularly displaced in the direction of the arrow C to place the blown articles, hitherto in an inverted position, in a dependent upright position for presentation to the trimming unit 15. Now the piston and cylinder assembly 7 is actuated to raise the spigot and mould assembly to return the same along a vertical course to the extruding station in an open and empty condition so as to accept and to close around two further tube lengths from the extruder. The arrow D indicates the direction of this latter movement. One cycle of the spigot and mould assembly is thus completed.

Whilst in the above described apparatus the spigot and mould assembly moves away from a station beneath the extruder head along a downwardly inclined path then back along a horizontal path for final raising vertically into the said position, the assembly may equally be arranged initially for downward vertical movement and then for horizontal movement to the right in the drawing towards a trimming unit for final raising to the said station along an upwardly inclined path.

In a further alternative, the assembly may be arranged initially for movement along an upwardly inclined path, then for movement vertically downwards to a trimming unit. Finally the assembly would be moved horizontally back to the said station. In another alternative the assembly may be arranged initially for horizontal movement to the right in the drawing and then for vertical movement to a trimming unit. Finally the assembly would be returned along a downwardly inclined path to said station.

It will be appreciated that, in such an arrangement, a further similarly mounted spigot and mould assembly may be used in conjunction with the extruder, the two assemblies being arranged to face one another such that the downwardly inclined components of their paths of movement extend downwardly and outwardly from a station beneath the extruder head. With such an arrangement the assemblies will be operated out of phase, that is, whilst one assembly is carrying out a blowing operation, the other assembly is collecting lengths of extruded tube from the head.

This arrangement for mounting each spigot and blow mould assembly so that the assembly follows a triangular path can be utilised to ensure that the assembly is brought, in the upward direction, as close to the head as possible thus to close the mould about extruded tube lengths at a position as close to the extrusion dies as is possible. Such an arrangement considerably reduces the amount of "flash" material which will be left on the mould when the assembly is withdrawn for blowing and extraction.

Ejection of articles from a mould after blowing and trimming may be effected by, for example, a blast of compressed air applied to the sides of the blown articles to project them from the blowing spigots. Since, in the present arrangement, this step will occur at a position spaced from the extruder, articles ejected from a mould will not tend to strike against the lengths of tube being extruded from the head. In addition, since this ejection occurs at a low position of the assembly, the blown articles will not have to fall very far before collection in, for example, a bin or like receptacle. Since only a small amount of flash will exist on the mould parts for subsequent removal by scraper or like means, it will be appreciated that there is less likelihood of damage to blown articles which will still be in a somewhat plastic state, due to the adherence thereto of pieces of flash removed by scraper blades or the like.

We claim:

1. In blow moulding apparatus having an overhead extruding station at which a tube is extruded, a mould and blowing spigot assembly for receiving said tube and blow moulding the latter, and a discharge station vertically below said extruding station and at which the moulded tube is discharged: means mounting said assembly for movement from a first position at said extruding station to a second position at said discharge station, and return; and operating means connected to said mounting means for moving said assembly along a closed orbital path having a first course extending away from said stations, a second course extending toward said discharge station and a third course extending back to said extruding station.

2. The construction set forth in claim 1 wherein said path is triangular.

3. The construction set forth in claim 2 wherein said second and third courses of said triangular path are normal to each other and being joined to one another along said first course, said first course constituting the hypotenuse of said triangular path.

References Cited by the Examiner

UNITED STATES PATENTS

| 2,789,312 | 4/1957 | Borer | 18—5 |
| 2,864,124 | 12/1958 | Strauss | 18—5 |
| 2,954,581 | 10/1960 | Colombo | 18—5 |
| 3,009,198 | 11/1961 | Kalman et al. | 18—5 |
| 3,011,216 | 12/1961 | Gussoni. | |
| 3,075,239 | 1/1963 | Strong | 18—5 |

J. SPENCER OVERHOLSER, *Primary Examiner.*

MICHAEL V. BRINDISI, WILLIAM J. STEPHENSON, *Examiners.*